H. R. STRAIGHT.
MINING MACHINE.
APPLICATION FILED MAR. 31, 1919.
1,425,913.
Patented Aug. 15, 1922.
8 SHEETS—SHEET 3.
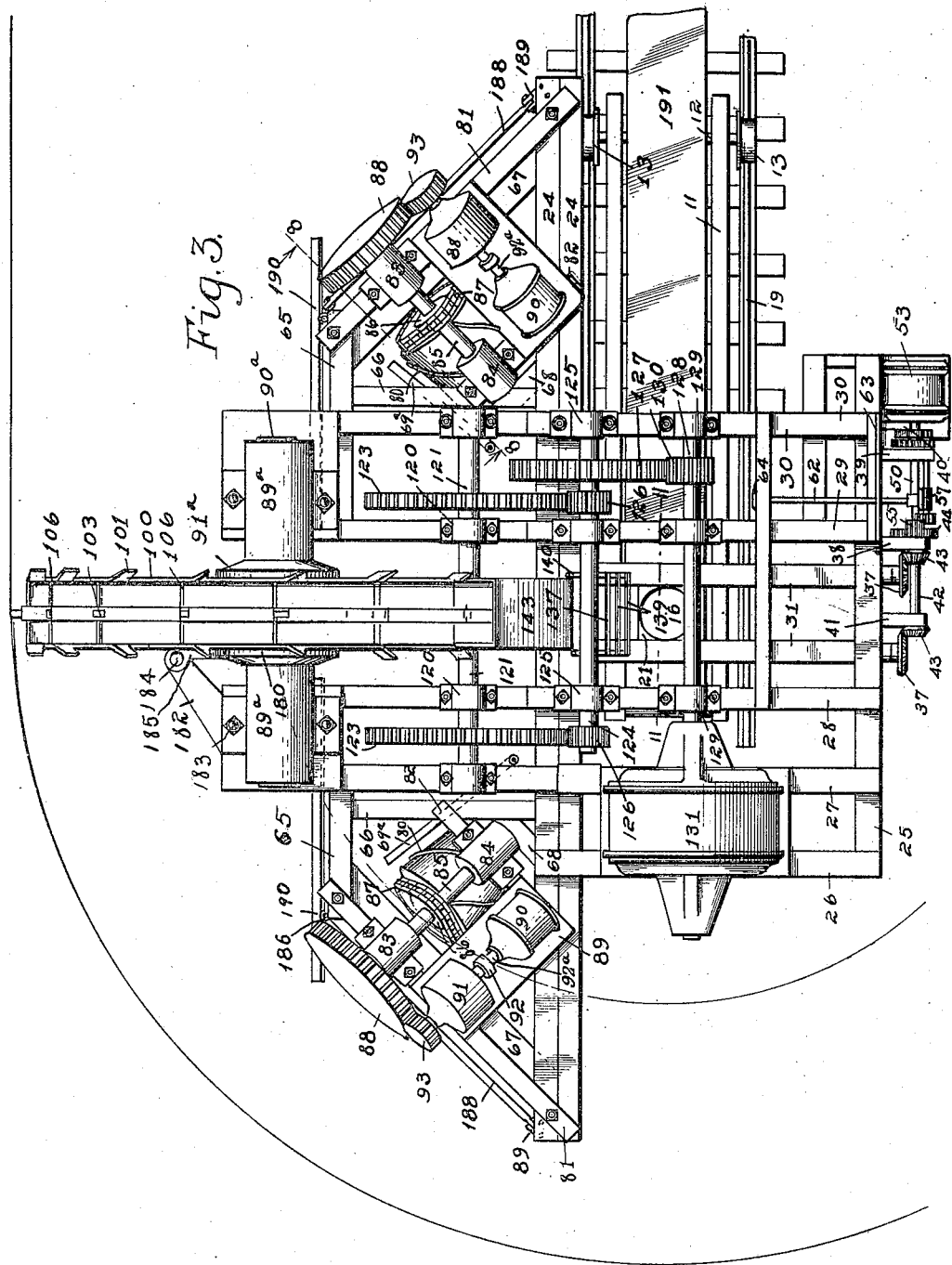

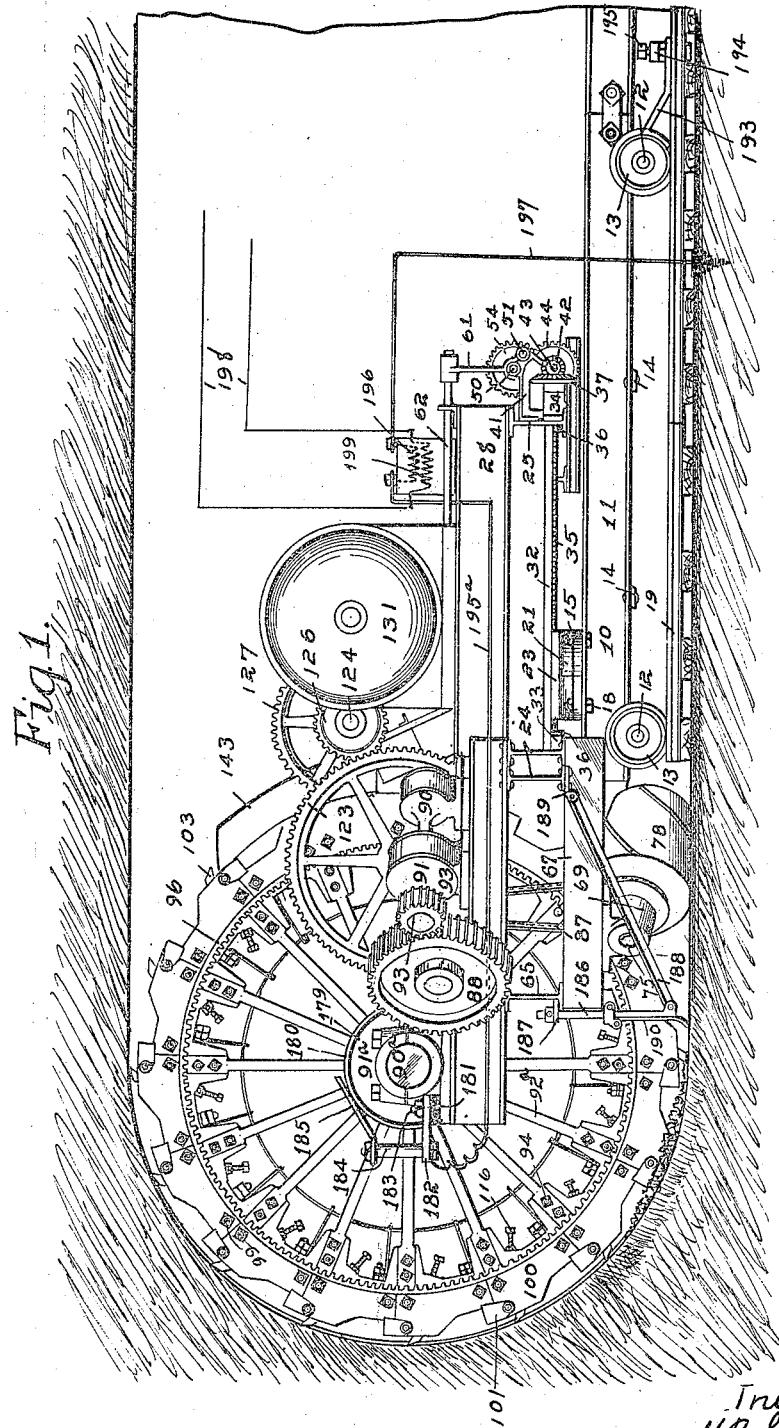

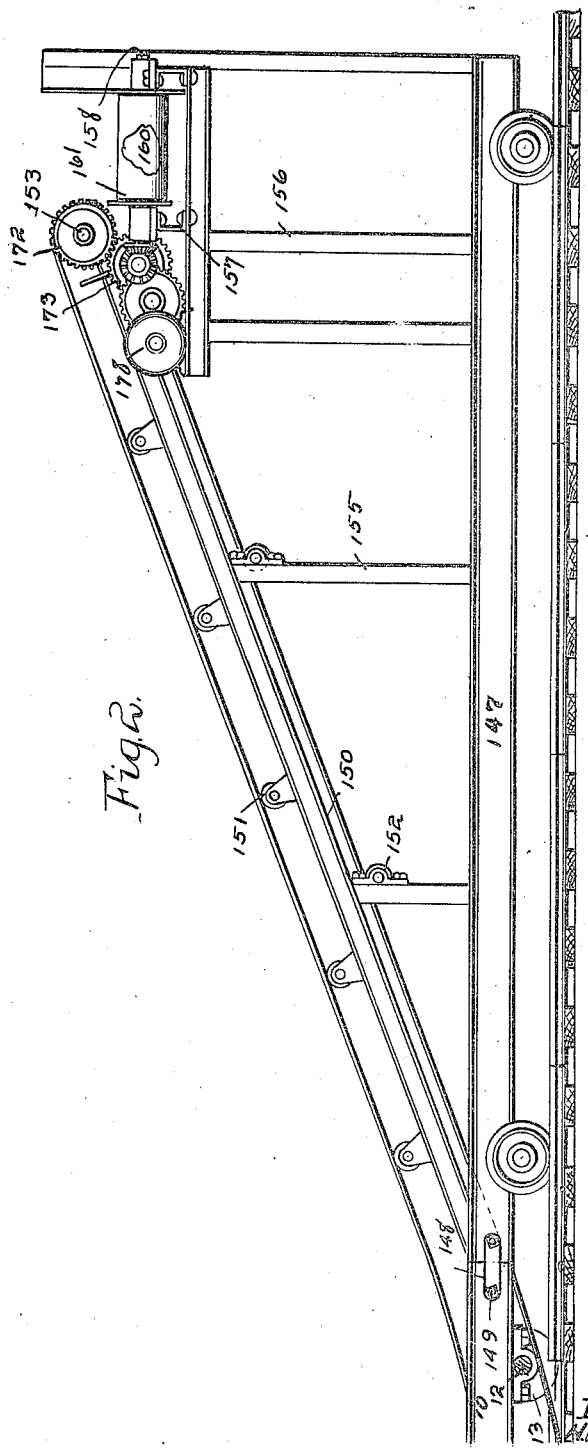

H. R. STRAIGHT.
MINING MACHINE.
APPLICATION FILED MAR. 31, 1919.
1,425,913.
Patented Aug. 15, 1922.
8 SHEETS—SHEET 4.
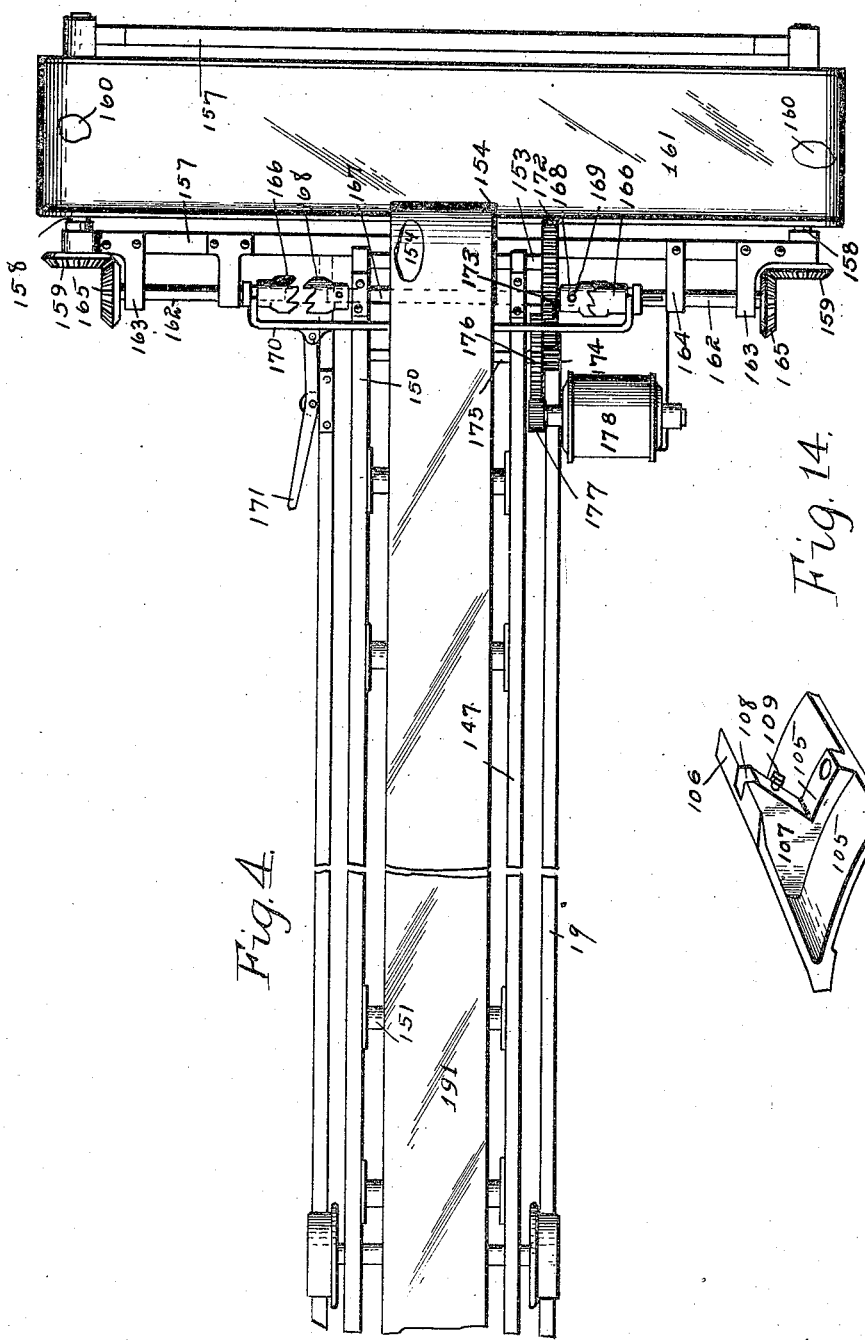

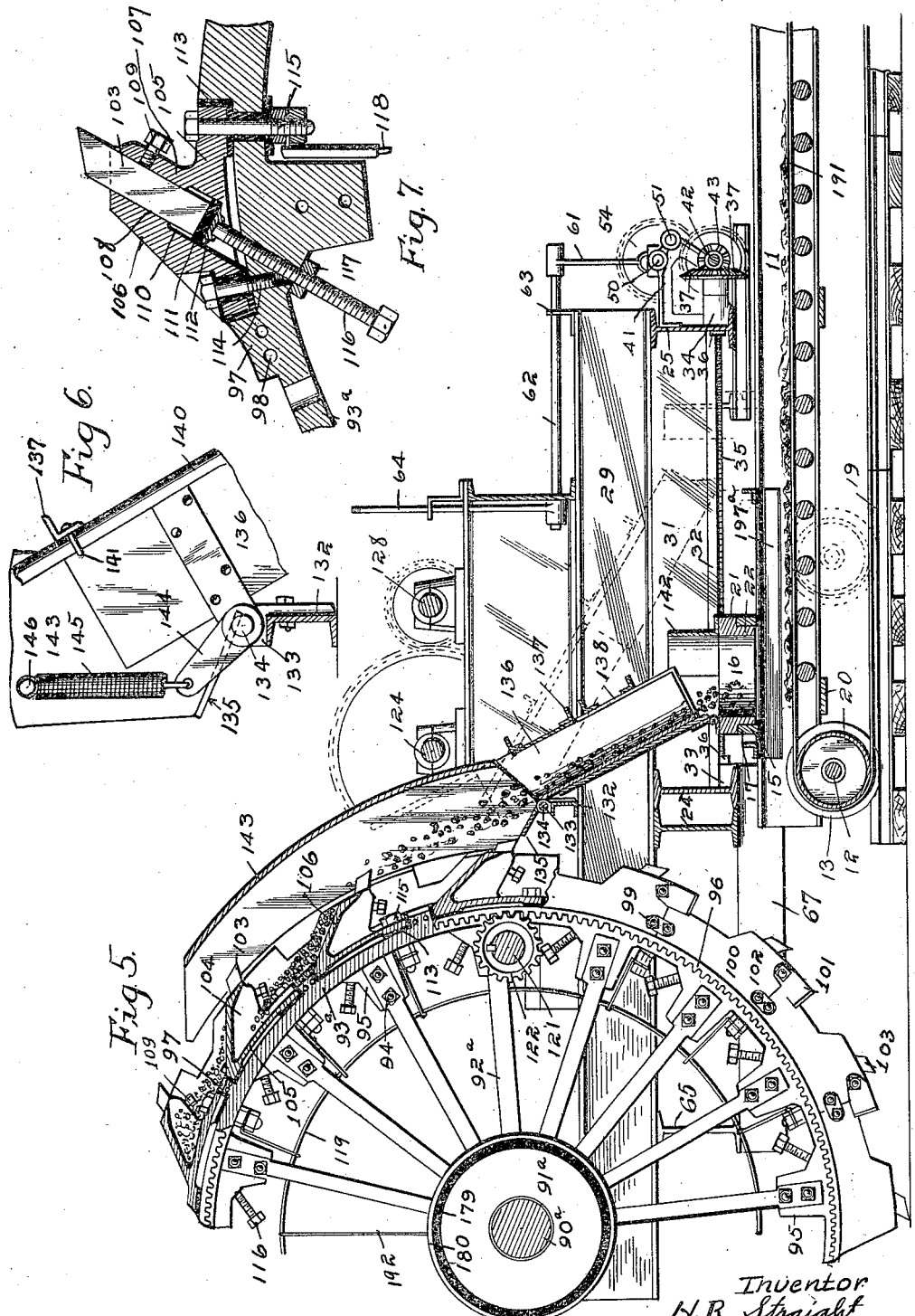

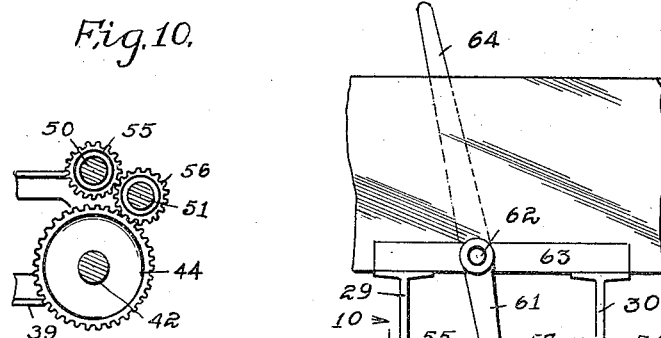
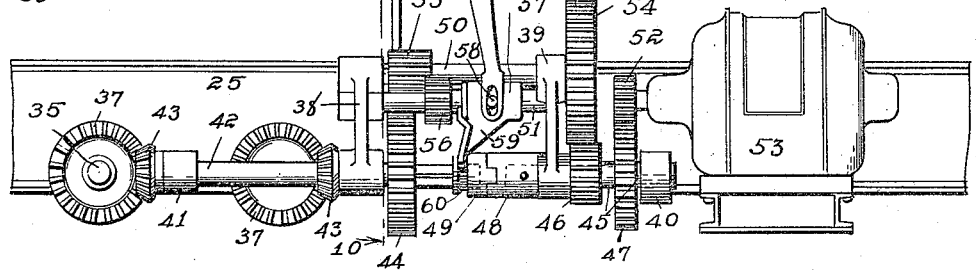
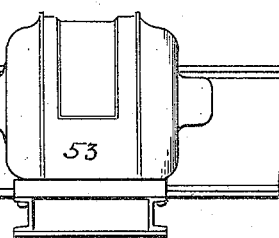
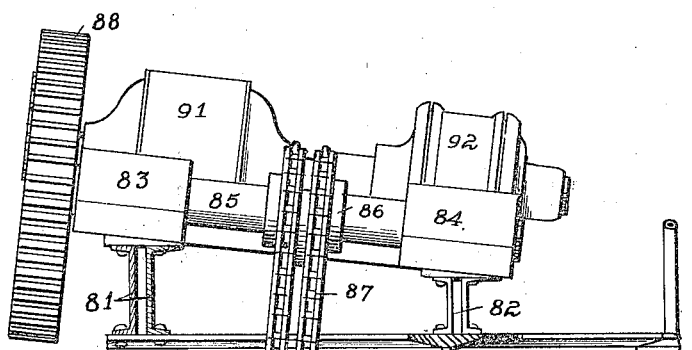
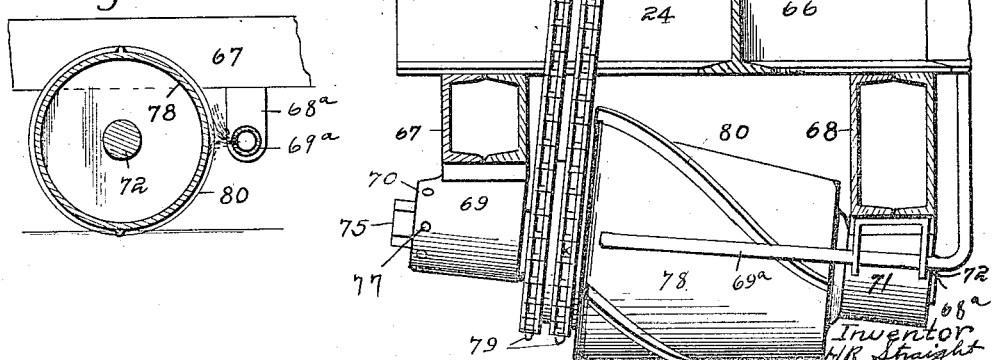

H. R. STRAIGHT.
MINING MACHINE.
APPLICATION FILED MAR. 31, 1919.

1,425,913.

Patented Aug. 15, 1922.
8 SHEETS—SHEET 7.

Inventor
H. R. Straight
by Alfred H. Hogue
atty

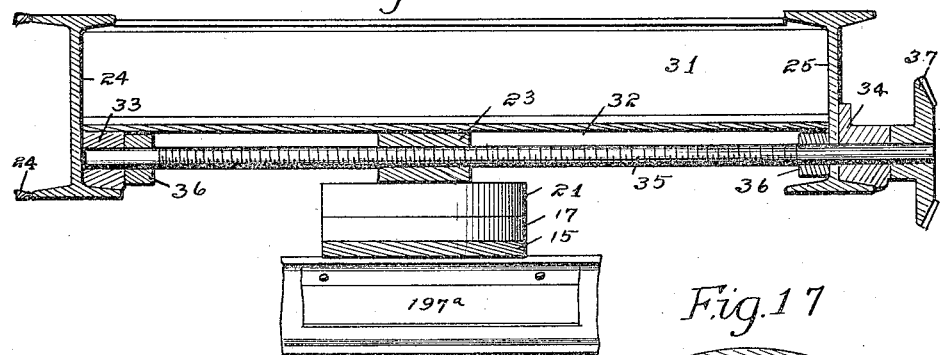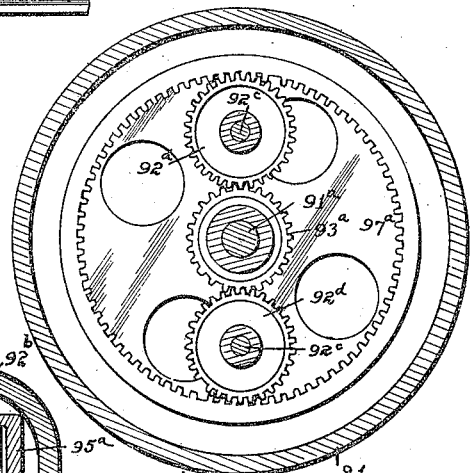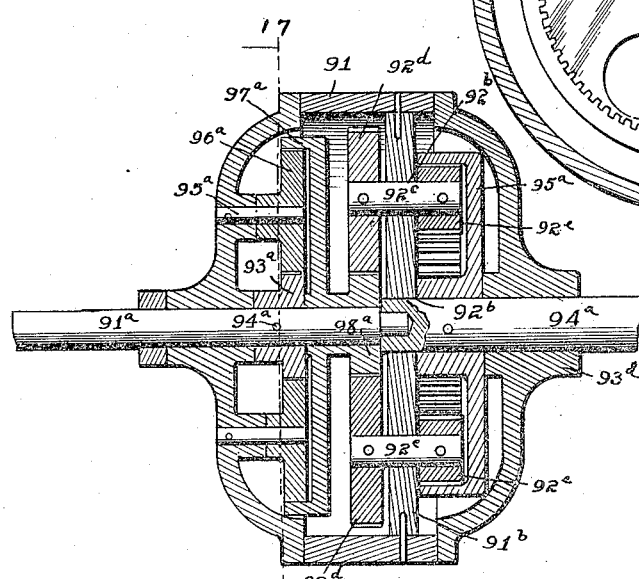

UNITED STATES PATENT OFFICE.

HALVER R. STRAIGHT, OF ADEL, IOWA.

MINING MACHINE.

1,425,913.   Specification of Letters Patent.   Patented Aug. 15, 1922.

Application filed March 31, 1919. Serial No. 286,564.

*To all whom it may concern:*

Be it known that I, HALVER R. STRAIGHT, a citizen of the United States, residing at Adel, in the county of Dallas, State of Iowa, have invented a new and useful Mining Machine, of which the following is the specification.

This invention relates to mining machinery adapted to mining rock salt, sulphur, oil shale, etc., and is especially adapted to mining oil shale.

Oil shale is a substance of a bituminous nature and will produce crude oil and ammonia by destructive distillation, large quantities of it has been found in the mountainous regions of certain parts of the United States in layers or veins from ten to fifteen feet in depth and in a good many cases above the valley floors. It may be mined by tunneling or drifting. Oil shale is hard and tenacious at atmospheris temperatures but becomes quite soft, rotten and volatile when heated to a temperature of three or four hundred degrees.

It has been customary heretofore to mine it by the pick and blasting, after which it is necessary to crush it by a special crusher before submitting it to the distillation process. This causes a large amount of very fine material which is more or less objectionable. On account of its viscous and elastic nature at normal temperature it is hard to drill with an ordinary pneumatic drill, the drill having a tendency to bounce without materially cutting the shale. It does not blast readily, the charge having a tendency to blow out rather than break and shatter. When the chunks are blown off they are hard to break and handle, therefore an object of my invention is to provide a mining machine of simple, durable and comparatively inexpensive construction capable of cutting and breaking the oil shale and similar materials in small chunks without too much fine material, and automatically elevating and delivering it to cars for transportation to a retort for distillation.

A further object is to provide, in a mining machine, for excavating hard materials that carry volatile hydrocarbon, means for heating and softening the material at the cutter points without materially volatilizing the contained hydrocarbons or elements.

A further object is to provide in a mining machine, an excavator member having cutters and buckets capable of excavating, elevating and delivering material, all formed unitedly acting as a single unit having no moving parts to loosen or wear out.

A further object is to provide in a mining machine having an excavator mounted on a swinging frame, new and improved means for delivering the material from the excavator to a fixed predetermined point.

A further object is to provide a machine having a member designed to rest on a track and a frame supporting an excavator, the said frame being mounted for swinging movement, and for forward movement, the said machine being provided with means for advancing said frame relative to the first member and for drawing the first member forward relative to the frame.

A further object is to provide a machine comprising a member to be suitably supported and a frame for carrying an excavator, capable of a swinging, a rotary and a forward movement and means on said frame for operating the excavator, and delivering the material excavated to a fixed point.

Other objects will appear in my description and claims. I obtain these objects by the mechanism illustrated in the accompanying drawings in which:

Fig. 1 shows a side elevation of the front end portion of my improved mining machine.

Fig. 2 shows a side elevation of the rear end of the same.

Fig. 3 shows a top view of Fig. 1 with the excavator member at right angles to the track and at right angles to the position shown in Fig. 1.

Fig. 4 shows the plan view of Fig. 2.

Fig. 5 is a central longitudinal sectional view of a segment of the excavator member, supporting frame, truck and conveyor.

Fig. 6 is a detailed view showing a portion of the spring actuated safety plate.

Fig. 7 is a longitudinal sectional view taken through the center of the cutter holder and supporting rim, showing the method of insulation.

Fig. 8 is a sectional view taken on the line 8—8 of Fig. 3.

Fig. 9 is a rear elevation of the speed reducing mechanism for the advance feed device.

Fig. 10 is a detailed sectional view taken on the line 10—10 of Fig. 9.

Fig. 14 is a perspective view of the cutter holder.

Fig. 15 shows a sectional view of the roller and the heater for heating the same.

Fig. 16 is a central longitudinal sectional view of the speed reducing gears and casing.

Fig. 17 is a transverse sectional view taken on the line 17—17 of Fig. 16. Fig. 18 is a detailed sectional view taken on the line 18—18 of Fig. 11.

Similar numbers refer to similar parts throughout the several views.

Figure 13:
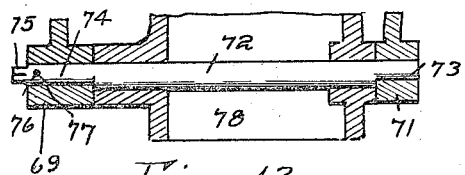
Fig. 13 is a longitudinal sectional view showing roller supporting axle and a segment of the roller.

The numeral 10 indicates the truck having side members 11, axles 12 and wheels 13. The side members 11 are secured together by means of transverse bars 14. Mounted upon the side members 11 is a pivot frame 15 having a circular opening 16 and an upwardly extending annular flange 17. The frame 15 is secured to the members 11 by means of bolts 18. The truck 10 is designed to rest on a track 19, the said track being constructed in short sections for the purpose hereinafter more fully set forth.

Rotatively mounted upon the front axle 12 and between the members 11 is a belt pulley 20. Rotatably supported on the flange 17 of the frame 15, is a frame 21 having a downward extending annular flange 22 designed to fit and move in the flange 17, the said frame 21 being provided with fixed slide blocks 23 at diametrical opposite sides of the flange 22. The said blocks 23 are provided respectively with screw threaded holes parallel with each other.

Figure 11:
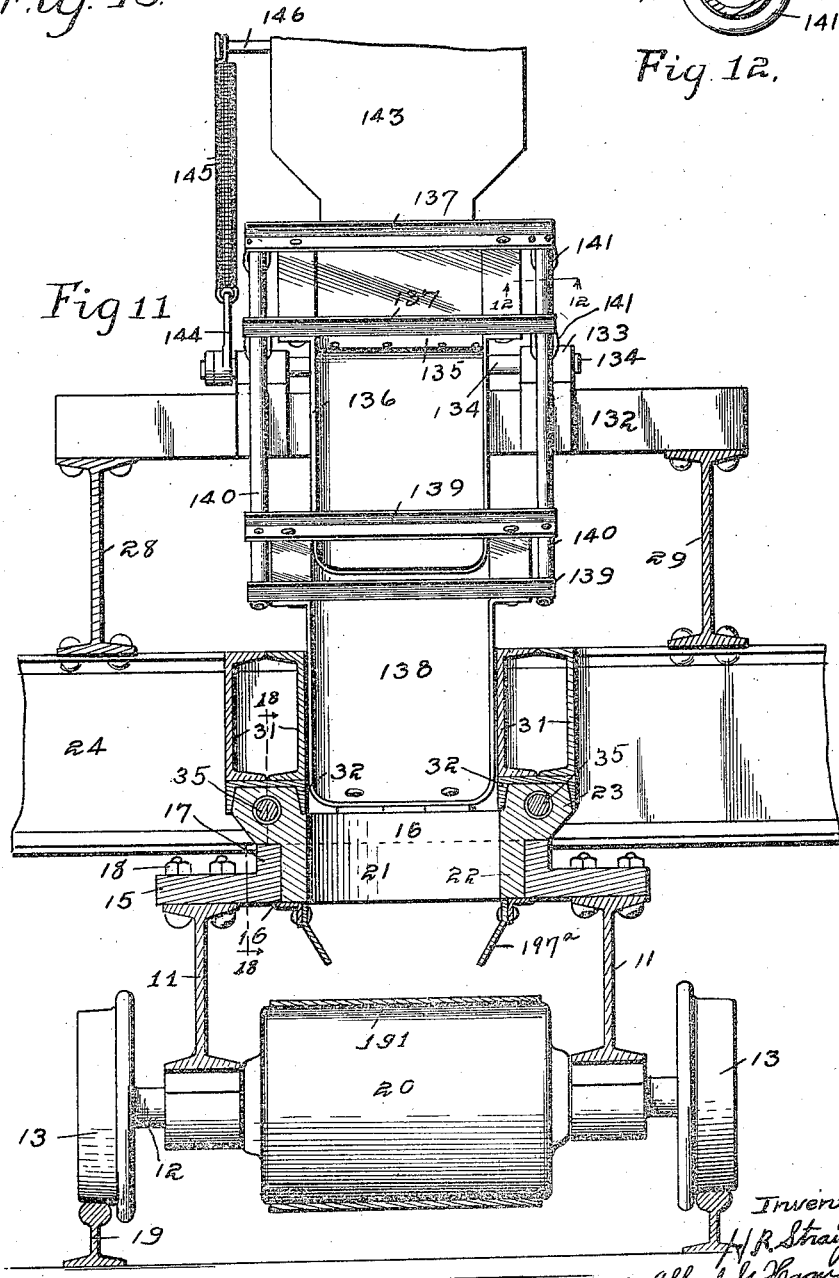
Fig. 11 is a detailed sectional view taken on the line 11—11 of Fig. 3.

For mounting machinery hereinafter to be described, I have provided a frame, comprising two adjacent transverse beams 24, a beam 25 parallel therewith, longitudinal beams 26, 27, 28, 29 and 30 resting on top of said transverse beams. Secured longitudinally, between the beams 24 and 25, are two sets of parallel channels 31. Secured beneath each set of the channels 31, is a channel 32 having its channel side facing downward to form guides and designed to receive the blocks 23 of the frame 21 as illustrated in Fig. 11.

Secured to the rear side of the back beam 24 and beneath each channel 32, is a bearing 33. Secured to the back side of the beam 25, beneath and adjacent to each end of the channels 32, is a bearing 34. Rotatively mounted in the bearings 33 and 34 and the slide blocks 23 are screw threaded shafts 35 arranged longitudinally beneath the channels 32 and provided with thrust bearings 36 at each end designed to engage the ends of said bearings 33 and 34. Mounted on the rear end of each shaft 35, is a bevel gear 37. The channels 32, the blocks 23, and the screws 35 are for the purpose of sliding the frame member relative to the pivot member 21.

For simultaneously operating the screws 35, I have provided the following mechanism:

Secured to the back side of the beam 25, are bearings 38, 39, 40 and 41. (Fig. 9 and Fig. 3.) Rotatively mounted in the bearings 38 and 41 is a shaft 42. Secured to said shaft 42 and in mesh with the gears 37, are bevel gears 43. A spur gear 44 is secured near the end of said shaft 42. Rotatively mounted in the bearings 39 and 40 and in line with the shaft 42, is a shaft 45. Secured to said shaft 45 between the said bearings, is a pinion 46 and a gear 47. For operatively connecting the shaft 45 and the shaft 42, I have secured a clutch member 48 to the shaft 45 and provided a slideably mounted clutch 49 on the shaft 42 to engage and disengage the clutch member 48. For operating the shaft 45, I have provided a motor 53 having a pinion 52 in mesh with the gear 47. It is desirable at times, as hereinafter to be made clear, to operate the shaft 42 in a reverse direction and at a higher rate of speed than the shaft 45. To accomplish this I have provided a rotatively mounted shaft 50 in the bearings 38 and 39 parallel with the shafts 42 and 45. A fixed shaft 51 is also mounted therein. To the end of the shaft 50, and in mesh with the pinion 46, is a gear 54. Secured to the opposite end of the shaft 50 from the gear 54 and in line with the gear 44, is a pinion 55. The face of the pinion 55 is considerably wider than the face of the gear 44 and is of such a diameter as to be out of operative relation therewith.

A pinion 56 is rotatively and slideably mounted on the shaft 51 and is in mesh with the pinion 55. A block 57 is slideably mounted on the shaft 51, having pins 58 and a downwardly projecting portion 59, the said downwardly projecting portion being provided with a bifurcated end which is designed to rest in the groove 60 in the clutch member 49. A lever 61 is secured to a longitudinal shaft 62, and is operatively connected with the pins 58 of the member 59, the said shaft being rotatively mounted in a bearing 63. A hand lever 64 is secured at the opposite end of the shaft 62. It will be seen by moving the lever 64 to the right, for instance, that the clutch 49 will be moved out of engagement with the clutch 48, and the pinion 56 will be moved into engagement with the spur gear 44. The purpose of this will be described in connection with the practical explanation of the operation of the machine.

For carrying the free end of the frame in a semi-circular path, I have provided the following mechanism.

Secured to the forward ends of the frame members 27, 28, 29 and 30, are transverse members 65. Secured between the members 65 and the members 24, and adjacent to the members 27 and 30, are beams 66. Arranged diagonally beneath the outer ends of the members 65 and 24, are channels 67; mounted between the beams 24 and the members 65 are diagonal channels 68. Mounted beneath the channels 67 are bearings 69, the said bearings 69 being provided with projecting portions 70. Secured beneath the channels 68 and in line with the bearings 69, are bearings 71. The bearings 69 and 71 are designed to carry a shaft 72, the said shaft 72 being provided at one end with an eccentric portion 73 and at the other end with an eccentric portion 74 and a hexagon portion 75. The portion 74 is provided with a hole 76, which is designed to receive the pin 77.

Rotatively mounted upon each of the shafts 72, is roller 78 having the shape of a frustum. The shafts 72 are arranged at angles to each other of about 90 degrees and equi-distant from the longitudinal line through the center of the frame and pivot truck. Secured to one end of each of the rollers 78, are two sprocket wheels 79. The rollers 78 are provided with spiral ribs 80 arranged in opposite directions, the ribs of each roller being so arranged as to lie in lines parallel with a longitudinal center line extending through the frame and pivot truck, at the lower sides where they make contact with the ground or floor of the tunnel.

Secured to the bottom of beams 67, is a bracket $68^a$ in which is mounted a horizontally arranged burner $69^a$ the said burner is designed to be placed ahead of the roller 78 a slight distance and is for the purpose of heating the outside of the roller so that material that may stick to the roller will more easily disengage it. The opposite end of the burner $68^a$ is designed to extend upward and connect with any suitable gas supply.

Secured above the members 67 and resting on the members 24 and 65, are beams 81. A similar beam 82, but of less height and nearer the center of the machine is provided resting on the members 24 and 66. These beams are for the purpose of supporting bearings 83 and 84. The said bearings are designed to receive shafts 85, the said shafts being mounted parallel with the shafts 72. Secured to each of the shafts 85, near the central portion, is a double sprocket pinion 86. Chains 87 are provided for the sprockets 86 and designed to pass around the sprockets 79. Secured to the outer end of each of the shafts 85, is a spur gear 88. Resting upon the members 81 and 82, are plates 89. Each of these plates is designed to have a reversible motor 90 mounted thereon and in line with said motor, a speed reducing gear casing 91. This gear case is provided with a driving shaft $91^a$, the outer end of which is connected to a coupling 92 and driven from the motor shaft $90^a$ of the motor 90. Near the inner end of the shaft $91^a$ is a pinion wheel $93^a$ secured thereto by a pin $94^a$. Secured in one end of the casing 91, are studs $95^a$ having pinions $96^a$ rotatively mounted thereon and in mesh with the pinion $93^a$. Rotatively mounted on the inner end of the shaft $91^a$, is an internal gear $97^a$ in mesh with the pinions $96^a$. The gear $97^a$ is provided with a hub on which is mounted a pinion $98^a$. Secured near the center of the casing 91 is a disc $91^b$. This disc $91^b$ is provided with an opening $92^b$, and shafts $92^c$ rotatively mounted therein. Each of the shafts $92^c$ is provided at one end with a comparatively large pinion $92^d$ in mesh with the pinion $98^a$. The opposite end of each of the shafts $92^c$ is provided with a comparatively smaller pinion $92^e$. Rotatively mounted in the opening $92^b$ and the bearing $93^d$ is a driven shaft $94^a$, the outer end of which is secured to the pinion 93. (Fig. 3.) Secured to the shaft $94^a$, I have provided an internal gear $95^a$ in mesh with the pinion $92^e$. It will be seen that as the shaft $91^a$ is rotated through the motor 90, the shaft 94 will be driven at a considerably slower speed. This speed reducer 91 is similar to those already on the market and forms no part of my present invention.

Thus it will be seen that if both of the motors 90 are rotated in the same direction, the pinions 93 will be rotated through the gear casing 91 and rotation imparted to the spur gears 88. This will rotate the shaft 85 together with the sprocket pinions 86, which will in turn rotate the rollers 78 through the chain 87 and the sprockets 79. This rotary motion in the same direction will cause the frame member to be moved in the circular path about the member 17 as the pivot. If the direction of the motor is reversed, the frame will be swung in a reverse direction.

Secured to the forward ends of the frame members 27, 28, 29 and 30, are bearings $89^a$. These bearings are designed to receive the shaft $90^a$, the central portion of which is provided with the hub $91^a$. The hub $91^a$ has spokes $92^a$, the outer ends of which are designed to carry a rim 93ª by means of bolts 94, the bolts being designed to pass through the inwardly projecting members 95. Each edge of the rim 93ª is provided with the internal gear 96 and the periphery of the rim is provided with lugs 97, the said lugs having holes 98 to receive bolts 99, which are designed to secure side members 100 to the edges of said rim. The members 100 are provided with outwardly extending lugs 101 and with lugs 102 which are designed to overlap the end of the adjacent members. It will be seen that these members 100 form annular side members. The hub 91ª, spokes 92ª and the rim 93ª form an integral member which is for the purpose of carrying buckets and cutters. The members 100 form the side members of the buckets. The cutters 103 are mounted in a casting 104. This casting is provided with a segmental portion 105 and a plate 106, the plate 106 being set at an acute angle with the segment 105. At the central portion of the plate 106, is a rib 107 having a recess 108. This recess is for the purpose of holding the cutter 103. The cutter is secured in position by means of a set screw 109. The inner portion of the recess 108 is provided with an enlarged portion 110 which is for the purpose of receiving an insulating block 111. This block 111 is provided with a bearing plate 112. The cutter holder is insulated from the rim 93ª by means of suitable insulating material 113 as clearly shown in Fig. 7. The said holder is secured to the rim by means of bolts 114 and 115. The bolt 114 is insulated from the cutter member and the bolt 115 is insulated from the rim. The rim is also provided with a set screw 116 designed to be in line with the insulated block 111 and designed to rest against the same. A lock nut 117 is provided for said bolt. The plate 106 is of such a width as to engage the side members 100 at each side. The back side of the member 105 is designed to rest against the lug 97.

Thus it will be seen that buckets will be formed by means of the plates 106 and the side members 100, the plate 106 being placed at such an angle as to cause the material to be moved toward the center of the wheel as they travel upwardly, and to cause the material to be discharged outwardly as they move downwardly at the back side.

Each bolt 115 is connected with an electric wire 118 each of which is connected to a circular wire 119.

Secured to the top of the members 27, 28, 29 and 30 are bearings 120. These bearings are designed to receive shafts 121. On the inner end of each of the shafts 121, is a pinion 122 designed to mesh with an internal gear 96. Mounted upon each of the shafts 121, is a large spur gear 123. A shaft 124, parallel with the shafts 121, is mounted in bearings 125. Mounted on the shaft 124 are pinions 126 in mesh with the gears 123. Adjacent to one of the pinions 126, is a gear 127. A shaft 128 is arranged parallel with the shaft 124 and is rotatively mounted in bearings 129. A pinion 130 is secured to the shaft 128 and in mesh with the gear 127. A motor 131 is designed to rotate the shaft 128. Mounted on one end of the hub 91ª is a rim of insulating material 179 which is designed to carry a slip ring 180, the said slip ring 180 is connected with the wire 119 by a conductor 192. Secured to one of the bearings 89ª is an insulating block 181. This block is designed to carry a plate 182, said plate being secured in position by means of the bolt 183. On the free end of the plate 182 I have provided an upright 184, the upper end of which is designed to carry a spring contact member 185, designed to make contact with the ring 180.

Figure 12:
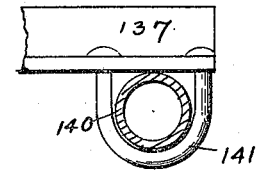
Fig. 12 is a sectional view taken on the line 12—12, Fig. 11.

For delivering the material from the buckets of the excavator member, I have provided a transverse member 132 resting on the members 128 and 129. Mounted on the top of the member 132 are bearings 133, said bearings being designed to receive the shaft 134, the said shaft being provided at its central portion with a plate 135. This plate is designed to extend upwardly and forwardly adjacent to the cutters 103. Pivotally mounted on the shaft 133, is a chute 136, the upper edge of which is provided with transverse bars 137 projecting laterally from the sides of the chute (Fig. 11). A second chute 138 has its lower end hinged to the member 21 and its upper end telescoping the chute 137. The top edge of the chute 138 is also provided with transverse bars 139, which have their ends extending laterally from the sides of the chute. The laterally extending ends of the bars 139 are designed to carry a rod 140. The rods 140 are designed to lay parallel with the side of the chute and pass beneath the outer ends of the bars 137. The outer ends of said bars are provided with U shaped bolts 141 which are slideably mounted on the upper ends of the rods 140, as is clearly shown in Fig. 12.

The semi-cylindrical plate 142 is designed to rest on the top of the member 21 and is for the purpose of forming a shield and direct the material through the center of said members as will be described.

To prevent material delivered by the bucket members from scattering, and to direct it to the chute 136, I have provided a lever 144 having at its free end a spring 145, the upper end of which is secured to a pin 146 in the side of the chute 143, the purpose of which will be more fully set forth.

Mounted on the track 19, and adjacent to the rear end of the truck 11, is a second truck 147. This truck is secured to the truck 10 by means of plates 148 and bolts 149. The truck 147 is provided with an inclined frame 150, upon which is mounted transverse rollers 151 and 152. Rotatively mounted in the rear end of the frame 150, is a shaft 153 on which a belt roller 154 is mounted. The frame 150 is secured in position by means of uprights 155 and 156. Mounted upon the rollers 20, 151, 152 and 154, is a belt 191. Secured transversely on the top of the members 156 are channels 157. The outer ends of these channels are designed to carry shafts 158. The forward end of each of the shafts 158 is provided with a bevel gear 159 and their central portions are provided with rollers 160. Rollers 160 are designed to carry the transverse belt conveyor 161. Extending longitudinally with the frame 157, are shafts 162. These shafts are carried by means of bearings 163 and 164. One end of each of the shafts 162 is provided with a bevel gear 165, which is designed to mesh with the bevel gear 159. The shafts 162 have at their inner ends slidable clutch members 166.

Rotatively mounted in the frame 150 and in line with the shafts 162, is a shaft 167, each end of which is provided with a clutch member 168, the said clutch member being secured to the shaft by means of a pin 169. I have provided a transverse bar 170 slidably mounted on the frame 150 and having its ends operatively connected with the clutch members 166. Operatively connected with the bar 170 is a lever 171, said lever being pivoted to the frame 150. The bar 170 is of such a length that one of the clutch members 166 will engage its adjacent clutch member 169 while the opposite clutch member 166 will disengage its adjacent clutch member.

Mounted upon the shaft 153, is a gear 172 in mesh with a gear 173 on the shaft 167. A pinion 174 is in mesh with the gear 173 and is carried by a transverse shaft 175. A gear 176 is also carried by the shaft 175 and is in mesh with the pinion 177 which is mounted on a motor 178.

Mounted upon and adjacent to the forward side of the members 65, are upright members 186, which have their upper ends slidably mounted in brackets 187. The lower ends of the uprights 186 are pivoted to inclined brace members 188, the back end of each brace member being secured to a member 24 by means of a bracket 189. Adjustably mounted on the uprights 186, I have provided a plate 190, the lower edge of which is curved forwardly and is designed to engage the floor for the purpose of moving material into position to be carried by the buckets.

For preventing the truck 10 from moving rearwardly, I have provided brackets 193, which are designed to rest against the back side of the wheels 13 and designed to rest on top of the rail 19. This bracket is secured in position by means of the clamp 194, having a set screw 195 for securing the said brackets to the said rail, the purpose of which will be more fully set forth.

Assuming that the track 19 has been laid in sections as illustrated in Fig. 5, and that the truck 10 is in position thereon and it is desired to operate the machine, the motor 131, which may be connected with any suitable current by means not illustrated in the drawings, will be rotated, which will in turn rotate the shaft 128, the pinion 130, the spur gear 127, which will in turn rotate the shaft 124. This shaft 124 has two pinions 126 rigidly secured thereto. These pinions will rotate the gears 123 simultaneously and together, the said gears 123 being mounted on shafts 121, the inner ends of which are provided with the pinions 122 which are rotated and in turn will rotate the internal gear 96.

Thus it will be seen that the rim $93^a$, together with the spokes $92^a$ and the hub $91^a$, will be rotated. They in turn will carry the cutter holders which comprise the plates 106 and the cutter members 103, as clearly shown in Fig. 1 of the drawings. The cutter members 103 will engage the material at a point vertically below the center of the shaft and continue to engage it until it has reached the point vertically above the said shaft. It is to be understood that the cutters and rotary member, rotate in a clockwise direction as shown in Fig. 1. While the motor 131 is being operated, the motors 90 will also be operated in the same direction, which will cause the pinions 93 and the gear 88 to be rotated and the rollers 78 as above described. This rotation of the rollers 78 will cause the supporting frame to be carried in a circular path about the center of the member 15 as a pivot.

Thus it will be seen that two motions are imparted to the cutters 103; a circular and a side or transverse movement. This transverse movement causes the cutters to be fed into the material. When the cutters have reached a position at right angles to a longitudinal center line through the truck 10, the motors 90 are reversed, which will cause the supporting frame to rotate in the opposite direction. As the cutters are being rotated, a portion of the material therefrom will fall in the buckets formed by the plates 106, and a portion of it will fall down the side of the portion excavated. In order to give clearance to the cutters, the side members 100 are made narrow and provided with notches. On account of this width, a portion of the material will not be gathered by the buckets. For gathering this portion of material, I have provided plates 190 which are set parallel with the frame members 65. This will set the said plates at an angle to the path travelled by the rollers 78 as will be clearly shown in Fig. 3. As the frame moves, the said plates 190 will be carried thereby. The plate ahead of the cutters will raise slightly up, travelling over any material that might be in its path. This upward movement is permitted by the support 186 sliding upward in the bracket 187 and also through the pivot connections with the member 188. The plate 190 back of the cutters will move the material forwardly up against the side of the wall and clean the floor in front of the roller 78. As the cutters move transversely, the sides of the members 100 will engage the material. I have provided the outwardly extending flanges 101 for the purpose of moving the said material into the path of the plates 106. The plates 106 rotate with the cutters and are placed back of them in such a position as to readily receive the material on their upward movement. The material will be carried by said plates and retained by means of the members 100. After the said plates 106 have passed over a point vertically above the shaft 90$^a$ to a position of approximately 45 degrees back of said vertical line, the material engages the back sides of the said plates 106 and is there continually moved downward, the angle of the plates changing to such a degree that the material will be thrown outward or tangent from the face of the plates. For receiving this material I have provided the chute 136, the chute 143 being designed to keep the material from spreading and to cause it to enter the chute 136.

It will be seen from the above description, that as the cutters are rotated and moved transversely, that the material will be cut into small chunks of the proper size to be used in retorts for distillation. To cut this material with less power, I have provided an electrical means for heating the shale and softening it. To accomplish this I have insulated the plate 106 and the tool or cutter 103 from the rim 93$^a$ and have connected them electrically with the wire 119 through the bolts 115, as is clearly shown in the Fig. 5 and Fig. 7. The wire 119 is connected with the wire 192, which is connected with the slip ring 180 as before described. A wire 195$^a$ is connected with an induction coil 196. This in turn is connected by a ground wire 197. A primary circuit is established through wires 198 which are connected with the primary coil 199. By this arrangement, when the current is switched on the line 198, a very heavy current will be produced in the wire 195 and carried to the cutters 103 which engage the material to be removed and establish a circuit through the said material to the ground wire 197. The current passing from the point of the cutter 103 will heat the material at that point and cause it to be softened without materially heating the chunks that are excavated and thereby prevent the said chunks from giving off the volatile hydrocarbons.

After the supporting frame has been rotated to the end of its movement in either direction, it is necessary to move the cutter outwardly from the center of the pivot 15. This I accomplish through the slides 32 and the blocks 23 before described and the screws 35. The rotation of the shaft is accomplished by moving the lever 64 to the right as shown in Fig. 9. This will cause the pinion 56 to engage the gear 44 and the clutch member 49 to disengage the clutch member 48. The motor 53 is then started, which will cause the pinion 56 to be rotated through the speed reducing gears 55, 54, 46, 47 and 52. This in turn will rotate the shaft 42, which will cause the bevels 43 and 37 to be rotated, which will in turn rotate the screws 35 and the guide members 32 to be moved relative to the blocks 23.

After the frame has been moved about an inch, the motor is then stopped and the motors 90 reversed, which will cause the frame to be swung about its pivot as before described. After the frame has been advanced a number of times until the members 25 engage the pivot member 15, a section of track 19 is placed in front of the one in which the truck is mounted, the lever 64 is then moved to the position shown in Fig. 9 and the motor 53 started, which will cause the gears 52, and 47 to be rotated, and with them, the shaft 45. The shaft 42 will be rotated through the clutches 48 and 49 at a speed equal to the shaft 45 and in a direction opposite to that which it rotated to advance the supporting frame. The screws 35 will also be reversed. This will cause the truck 10 to be moved towards the cutters to the position shown in Fig. 1. The clamp 193 will then be again placed in position back of the rear wheels 13. It will be seen that the shafts 35 will be rotated at a considerably higher speed, which enables the truck 10 to be quickly moved into position. It will also be seen that as the truck is moved relative to the supporting frame, that the chutes 136 and 138 will be moved relative to each other, thereby accommodating the difference in distance between the shaft 134 and the members 21. In connection with this it will be seen that the members 137 will slide on the bars 140. This is for the purpose of preventing the chute from swagging in the center.

To provide against material lodging between the ends of the cutters 103 and the upper end of the chute 136, I have provided the plate 135, which is free to swing downward against the action of the spring 145 and let any large chunk of material pass that may be lodged without injuring the upper end of the chute. As the materials discharge from the plate 106 and slides downwardly through the chute 136 it will pass through the center of the member 22 and fall upon the conveyor 191. Plates 197ª are provided for throwing material to the center of the conveyor. The conveyor 191 is moved by means of the motor 178 and the gearings 177, 176, 174, 173 and 172. The materials will be carried rearwardly and upwardly and discharged upon the transverse conveyor 161. This transverse conveyor may be driven in either direction by manipulating the lever 171 to engage or disengage either of the sets of clutch members 168 and 166. It will be seen from the construction that when the device is reversed that the conveyor is driven from the end from which the material is discharged. Suitable cars may be provided to receive the material from the said transverse conveyor.

Sometimes it occurs while operating a machine, that one side of the floor will become lower than the other. To rectify this I have provided the eccentrics 73 and 74 on the shaft 72 as shown in Fig. 13. The outer end of the shaft 72 is provided with a hexangular portion 75 which is designed to receive a suitable wrench. The pin 76 is removed and the shaft 72 rotated until the hole 76 is in line with another hole in the hub 70. The pin 77 is again placed in position. This slight rotation of the shaft 72 will cause one side of the machine to be elevated or lowered depending altogether on which way the shaft has been rotated. The machine will then be operated until the floor has become level, at which time the pin 76 will be again withdrawn and the shaft 72 rotated to its normal position.

By the foregoing description, it will be seen that I have provided a machine which may be so operated as to enter the side of a mountain or vein of material to be excavated, and that the material may be automatically cut into small pieces, elevated and delivered to a point to the rear of the machine and delivered to cars which will deliver the material to the retorts to be distilled.

I claim:

1. In a device of the class described, a truck, a supporting frame pivoted thereon, an excavator on one end of said frame, means for driving said excavator, rollers for carrying the excavator end of said supporting frame, and independent means for rotating said rollers in either direction.

2. In a device of the class described, a unitary excavator member designed to excavate, elevate and deliver material, means for supporting and rotating said excavator member in a vertical plane, a pivot truck, means independently operated for alternately moving said excavator member transversely in a semi-circular path about the center of said truck while said excavator is being operated and means for conveying the material to a predetermined point of discharge.

3. In a device of the class described, a unitary excavator member designed to excavate, elevate and deliver material, means for supporting and rotating said excavator member in a vertical plane, a pivot truck, means for alternately moving said excavator member transversely in a semi-circular path about the center of said truck while said excavator is being operated, means for diminishing or increasing the radius of said circular path and means for conveying the material to a predetermined point of discharge.

4. In a device of the class described, a truck, an annular pivot member thereon, a supporting frame capable of pivotal movement relative to said annular frame, an excavator member on said frame capable of excavating, elevating and discharging material, a telescopic chute for receiving the discharged material and conveying it to a point where it will fall through said annular pivot.

5. In a device of the class described, the combination of a track, a truck thereon capable of longitudinal movement relative to said track, a supporting frame pivotally mounted on said truck, rollers for carrying the free end of said supporting frame in a circular path, an excavator member mounted on the free end of said frame, means for driving said excavator as it is moved in a circular path, and independent means for rotating said rollers in either direction.

6. In a device of the class described, a track, a truck thereon capable of longitudinal movement relative to said track, a supporting frame pivotally mounted on said truck, means for carrying the free end of said excavator frame in a circular path, an excavator on the free end of said frame, and means for driving said excavator when in any of its positions of circular movement, means for holding the truck against rearward movement, and means mounted on said supporting frame for moving said supporting frame longitudinally relative to said track.

7. In a device of the class described, the combination of a track, a truck thereon capable of longitudinal movement relative to said track, a supporting frame pivotally mounted on said truck, conical rollers for carrying one end of said supporting frame and designed to travel in a circular path on the floor, independent means for rotating said rollers in either direction.

8. In a device of the class described, a unitary excavator member comprising, a rotary support, a series of radially disposed cutters having their points in the circumference of a circle, a holder for each of said cutters, and means for insulating and detachably securing said holders to said rotary support.

9. In a device of the class described, a unitary excavator member comprising, a rotary support, a series of radially disposed cutters having their points in the circumference of a circle, means for detachably securing the cutters to said support, a detachable bucket member for each of said cutters and means carried by said bucket members for moving material laterally into said buckets.

10. In a device of the class described, the combination of a track, a truck thereon capable of longitudinal movement relative to said track, a supporting frame pivotally and slidably mounted on said truck, conical rollers for carrying one end of said supporting frame and designed to travel in a circular path on the floor, independent means for rotating said rollers in either direction, means for holding the truck against rearward movement and means for moving said supporting frame forward to increase the radius of the circular path of said rollers.

11. An excavator member comprising a hub having spokes, a rim secured to said spokes, said rim being provided with lugs on its periphery and an internal gear on each edge, cutter holders provided with laterally extending plates to form bucket bottoms, means for detachably securing said cutter holders to said rim adjacent to said lugs, detachable plates for bucket side members, a cutter for each of said holders, means for securing the cutters in said holders and means for adjusting said cutters.

12. In a device of the class described, a truck, an annular pivot frame on said truck, a second annular pivot frame mounted on said first pivot frame, a supporting frame having one end slidably mounted on the said second pivot frame, rollers arranged to carry the free end of said supporting frame in a horizontal semi-circular path, means for driving said rollers in either direction, means for moving the supporting frame relative to the second annular pivot frame to increase or diminish the radius of said circular path, a rotary member mounted on the free end of said supporting frame designed to excavate, elevate and discharge material, means for rotating said excavating member, means for receiving material from the excavator member and delivering it through the annular pivot members, and a conveyor for said truck for receiving and conveying material to a predetermined point of delivery.

13. In a device of the class described, a truck, a supporting frame pivoted thereon, a rotary excavator on one end of said frame, means for driving said excavator, conical rollers for carrying the excavator end of said supporting frame, and independent means for rotating each of said rollers in either direction.

14. In a device of the class described, a truck, a supporting frame pivotally and slidably mounted thereon, a rotary excavator on one end of said frame, means for driving said excavator, conical rollers for carrying the excavator end of said supporting frame, means for rotating said rollers in either direction, and means for moving said supporting frame radially in either direction.

15. A rotary excavator member capable of excavating, elevating and discharging material tangentially, conveying means for receiving the discharged material, and yielding means between said excavator and the said conveying means to permit chunks that might catch in the excavator to pass through without destroying the gathering end of the conveyor.

16. In a device of the class described, a truck, an annular pivot frame on said truck, capable of longitudinal movement in a horizontal plane, a second annular pivot frame mounted on said first pivot frame, a supporting frame having one end slidably mounted on the said second pivot frame, rollers arranged to carry the free end of said supporting frame in a horizontal semi-circular path, means for driving said rollers in either direction, a rotary member mounted on the free end of said supporting frame designed to excavate, elevate and discharge material, means for rotating said excavating member, means for receiving material from the excavator member and delivering it through the annular pivot members, means for moving the excavator member radially from the pivot truck at a comparatively slow speed, means for moving the pivot truck towards the excavator member at comparatively high speed, and a conveyor for said truck for receiving and conveying material to a predetermined point of delivery.

17. In a device of the class described, a truck, an annular pivot frame mounted on said truck, a second annular pivot frame mounted on said first pivot frame and provided with a slide block on two diametrically opposite sides, said blocks being provided with screw threaded holes, parallel with each other, a supporting frame, parallel guides in said frame slidably mounted on said slide blocks, parallel screw threaded shafts rotatively mounted in said frame designed to co-act with the said screw threaded holes, a bevel gear on one end of each screw threaded shaft, a bevel pinion in mesh with each of said bevel gears, a transverse shaft to carry both of said bevel pinions, a spur gear on said transverse shaft, a second transverse shaft adjacent to and in line with the first transverse shaft, a clutch jaw on the adjacent end of the second transverse shaft, a mating clutch jaw splined to the first transverse shaft, a motor, speed reducing gears between the motor and the said second transverse shaft, a reverse gear designed to slide in and out of mesh with the said spur gear, speed reducing gears operatively connected with the second transverse shaft and said reverse gear, and means for simultaneously sliding said reverse gear in mesh with the said spur gear and the said jaw member out of mesh with its co-acting jaw member, or vice versa.

18. In a device of the class described, a truck, an annular pivot frame mounted on said truck, a second annular pivot frame mounted on said first pivot frame and provided with a slide block on two diametrically opposite sides, said blocks being provided with screw threaded holes parallel with each other, a supporting frame, parallel guides in said frame slidably mounted on said slide blocks, parallel screw threaded shafts rotatively mounted in said frame designed to co-act with the said screw threaded holes, a bevel gear on one end of each screw threaded shaft, a bevel pinion in mesh with each of said bevel gears, a transverse shaft to carry both of said bevel pinions, a spur gear on said transverse shaft, a second transverse shaft adjacent to and in line with the first transverse shaft, a clutch jaw on the adjacent end of the second transverse shaft, a mating clutch jaw splined to the first transverse shaft, a motor, speed reducing gears between the motor and the said second transverse shaft, a reverse gear designed to slide in and out of mesh with the said spur gear, speed reducing gears operatively connected with the second transverse shaft and the said reverse gear, means for simultaneously sliding said reverse gear into mesh with the said spur gear and the said jaw member out of mesh with its co-acting jaw member, or vice versa, rollers to carry one end of said supporting frame in the semicircular path, a rotary excavating member on one end of said supporting frame designed to excavate, elevate and discharge material, means for rotating said excavator, means for driving said rollers, means for receiving material from the said excavator member and discharging it through said annular pivot members and means for receiving said material and conveying it to a predetermined point of discharge.

19. In a device of the class described, a truck capable of horizontal and longitudinal movement in a horizontal plane, a pivot frame mounted on said truck, a second pivot frame mounted on the said first pivot frame and provided with slide blocks, a supporting frame, parallel guides in said supporting frame, parallel screw threaded shafts operatively connected with said slide block, means for simultaneously rotating said shafts in one direction, means for rotating the said shafts in the opposite direction at a higher rate of speed, rollers arranged to carry one end of said frame in a semi-circular path about the pivot of said truck, means for driving said rollers in either direction, a rotary member mounted on the free end of said supporting frame designed to excavate, elevate and discharge material, means for rotating said excavating member, means for receiving material from the excavator member and delivering it through the annular pivot members and a conveyor for said truck for receiving and conveying material to a predetermined point of delivery.

20. In a device of the class described, a truck capable of horizontal and longitudinal movement in a horizontal plane, a pivot frame mounted on said truck, a second pivot frame mounted on the said first pivot frame and provided with slide blocks, a supporting frame, parallel guides in said supporting frame, parallel screw threaded shafts operatively connected with said slide block, means for simultaneously rotating said shafts in either direction, rollers arranged to carry one end of said frame in a semi-circular path about the pivot of said truck and means for driving said rollers in either direction, a rotary member mounted on free end of said supporting frame designed to excavate, elevate and discharge material, means for rotating said excavating member, means for receiving material from the excavator member and delivering it through the annular pivot members and a conveyor for said truck for receiving and conveying material to a predetermined point of delivery.

21. In a device of the class described, a truck, an annular pivot frame on said truck, a second annular pivot frame mounted on said first pivot frame, a supporting frame having one end slidably mounted on the said second pivot frame, rollers arranged to carry the free end of said supporting frame in a horizontal semi-circular path, means for driving said rollers in either direction, means for moving the supporting frame relative to the second annular pivot frame to increase or diminish the radius of said circular path, a rotary excavator member on said frame having circumferential cutters, a bucket for each of said cutters designed to discharge material tangentially therefrom, said member being designed to rotate in a vertical plane passing through the center of said pivot members, means for continuously driving said excavator member, means for receiving the discharged material and delivering it through said annular pivot members, and a conveyor on said truck for receiving the material from said annular pivot members and delivering it to a predetermined point of discharge.

22. In a device of the class described, a pivot truck, a pivot frame on said truck, a supporting frame slidably mounted upon said pivot frame, means for carrying one end of said supporting frame alternately and transversely in a semi-circular path, means for moving the supporting frame longitudinally relative to the pivot frame to increase or diminish the radius of the circular path, a rotary excavator member mounted on the free end of said supporting frame having a series of circumferential cutters, buckets for said cutters designed to discharge material tangential therefrom, the said member being designed to rotate in a vertical plane passing through the center of said truck and parallel with the longitudinal center of said supporting frame, means for continuously rotating said excavator member and means for receiving the discharged material and conveying it to a predetermined point.

23. In a device of the class described, a pivot truck, a pivot frame on said truck, a supporting frame slidably mounted upon said pivot frame, means for carrying one end of said supporting frame alternately and transversely in a semi-circular path, means for moving the supporting frame longitudinally relative to the pivot frame to increase or diminish the radius of the circular path, a rotary excavator member mounted on the free end of said supporting frame having a series of circumferential insulated cutters, buckets for said cutters designed to discharge material tangential therefrom, the said member being designed to rotate in a vertical plane passing through the center of said truck parallel with the longitudinal center of said supporting frame, means for continuously rotating said excavator member, means for receiving the discharged material and conveying it to a predetermined point, a primary circuit and a secondary circuit arranged to heat the points of said cutters for the purpose stated.

24. An excavator member having a cutter, means for moving said cutter through the material to be excavated, and electrical means for passing current through said cutters to the said material for the purpose stated.

25. In a device of the class described, a pivot truck, a supporting frame slidably and pivotly mounted thereon, means for moving said frame relative to said pivot frame, a rotary elevator member mounted on said frame comprising a supporting member, a rim on said supporting member having on each side an internal gear and on its periphery outwardly extending lugs, cutter holders, means for detachably securing a cutter holder adjacent to one of the said lugs and to the periphery of said rim, a detachable bucket for each cutter designed to discharge material tangential therefrom, a pinion for each of said internal gears, a shaft for each of said pinions in line with each other, a counter-shaft parallel with both of said shafts, a gear on each pinion shaft, a pinion keyed to said counter-shaft in mesh with each of said gears, a motor, speed reducing gears between the motor and said counter-shafts, means for moving the supporting frame about the pivot point and means for receiving and conveying the discharged material to a predetermined point of delivery.

26. In a device of the class described, an excavator member comprising a rotary support, an annular rim on said support provided with an internal gear on each side, outwardly projecting lugs, cutter holders having laterally extending plates to form bucket bottoms, a cutter for each holder, means for securing said cutters in position, means for detachably securing a cutter holder adjacent to each of said lugs and to said rim, annular side plates detachably secured to each side of said rim and adjacent to the ends of said laterally projecting plates and means for adjusting each of said cutters.

27. An excavator member comprising a support, an annular rim on said support having an outwardly projecting annular flange on each edge, a transverse plate between said annular flanges set on an angle with the face of said rim and provided with a cutter socket in its central portions, cutters for said sockets, means for securing said cutters in position in said sockets.

28. An excavator member comprising an annular rim outwardly projecting detachably annular flange members to form an annular groove, a series of insulated transverse plates, between said flanges to form buckets having an integral cutter holder, a cutter for each holder, means for securing said cutters in position in said holders and means for rotatively supporting said rim.

29. An excavator member comprising an annular rim, outwardly projecting detachable annular flange members to form an annular groove, a series of insulated transverse partitions, between said flanges to form buckets having an integral cutter holder, a cutter for each holder, means for securing said cutter in position in said holders, means in said rim for adjusting said cutters, an insulating means between said adjusting means and said cutters and means for rotatively supporting said rim.

30. A cutter holder comprising a cylindrical segment provided at one of its longitudinal edges with a plate at an acute angle with said cylindrical segment, said plate and segment being provided with a transverse rib extending between them, said rib being formed with a longitudinal opening designed to receive a cutter.

31. In a device of the class described, a truck, an annular pivot frame on said truck, a second annular pivot frame mounted on said first pivot frame, a supporting frame having one end slidably mounted on the said second pivot frame, rollers arranged to carry the free end of said supporting frame in a horizontal semi-circular path, means for driving said rollers in either direction, means for moving the supporting frame relative to the second annular pivot frame to increase or diminish the radius of said circular path, a rotary integral member mounted on the free end of said supporting frame designed to excavate, elevate and discharge material, means for rotating said excavating member, an inclined telescopic chute for receiving material from the excavator member and delivering it through the annular pivot members, a conveyor for said truck for receiving and conveying material to a predetermined point of delivery, a yielding bottom plate between the upper end of said chute and a rotary excavator member.

32. A truck having an annular pivot member, a supporting frame capable of pivotal and radial movement relative to said annular frame, a rotary excavator member capable of excavating, elevating and discharging material tangentially, a telescopic chute for receiving the discharged material and conveying it to a point where it will fall through the said annular pivot.

33. A truck having an annular pivot member, a supporting frame capable of pivotal and radial movement relative to said annular frame, a rotary excavator member capable of excavating, elevating and discharging material tangentially, a telescopic chute for receiving the discharged material and yielding means between the excavator and the upper end of said chute for the purpose stated.

34. In an excavating machine, a support, a cutter, an insulated cutter holder, means for detachably securing said cutter holder to said support, insulated means for adjusting said cutter and electrical means for producing a current of electricity between the points of said cutter and the material to be excavated.

35. In an excavating machine, a support, a cutter, an insulated cutter holder, means for detachably securing said cutter holder to said support and insulated means for adjusting said cutter.

36. In a device of the class described, a truck, a supporting frame pivoted thereon, a rotary excavator on one end of said frame, means for driving said excavator, conical rollers for carrying the excavator end of said supporting frame, and means for rotating said rollers in either direction.

37. In a device of the class described, a truck, a supporting frame pivoted thereon, a rotary excavator on one end of said frame, means for driving said excavator, conical rollers designed to rotate substantially about radial axes and support the excavator end of said supporting frame, means for driving said rollers, the said excavator being arranged to rotate in a vertical plane between said rollers.

38. In a device of the class described, a truck, a supporting frame pivotally mounted on said truck, an excavator on one end of said supporting frame, means for driving said excavator, conical rollers for conveying the excavator end of said frame in a circular path, means for tilting the frame relative to said rollers and means for driving said rollers in either direction.

39. In an excavator the combination of cutters, means for supporting and driving said cutters, an electric means for producing a current of electricity between the points of said cutters and the adjacent material to be excavated.

40. In an excavator, a support, a cutter, an insulated cutter holder and means for detachably securing said cutter holder to said support, and electrical means for producing a current of electricity between the points of said cutter and the adjacent material to be excavated, for the purpose stated.

41. In a device of the class described, a pivot truck, a supporting frame pivotally mounted on said truck, an excavator member on said frame having cutters and buckets, rollers for supporting and carrying said frame alternately in a semi-circular path and designed to travel on the floor formed by said cutters and means for moving material left by the excavator to a position out of the path of said rollers and to a position where it can be gathered by said buckets.

42. In a device of the class described, a pivot truck, a supporting frame slidably and pivotally mounted on said truck, an excavator member on one end of said frame, rollers on radial axes for carrying the excavator end of said frame in a circular path about said truck, means for increasing or diminishing the radius of said circular path by sliding said rollers in lines parallel with the line bisecting the angle between the axes of said rollers, said rollers being provided with spiral lugs designed to have their contact portions lay in line parallel with the said line of movement for the purpose stated.

43. In an excavator, a support, a cutter, an insulated cutter holder and means for detachably securing said cutter holder to said support.

44. In an excavator having an excavator frame capable of swinging in the arc of a circle and moving radially to increase the radius of said arc, conical rollers for carrying said frame and rotatively mounted on radial axes, said rollers being provided with spiral tractor ribs designed to lay parallel with said line of movement at the point of contact with the floor.

45. In a device of the class described, a truck, an annular pivot member thereon, a supporting frame mounted on and capable of pivotal and radial movement relative to said annular frame, an excavator member on said frame capable of excavating, elevating and discharging material and permitting it to fall through the said annular frame.

46. In a device of the class described, a track, a truck thereon capable of longitudinal movement relative to said track, a supporting frame pivotally mounted on said truck, means for supporting the free end of said frame to permit it to move in a circular path about its pivotal center, an excavator on the free end of said frame, means for driving said excavator, adjustable anchoring means secured to said track, means operatively mounted on said supporting frame and operatively connected with said anchoring means to impart forward movement to said supporting frame longitudinally with said track.

HALVER R. STRAIGHT.